July 19, 1932.  C. B. WEAVER  1,867,902
METHOD AND MEANS FOR REFUELING AEROPLANES IN FLIGHT
Filed Jan. 18, 1930   2 Sheets-Sheet 1

Inventor:
Charlie B. Weaver.
By R. S. Berry
Atty.

July 19, 1932. C. B. WEAVER 1,867,902
METHOD AND MEANS FOR REFUELING AEROPLANES IN FLIGHT
Filed Jan. 18, 1930 2 Sheets-Sheet 2
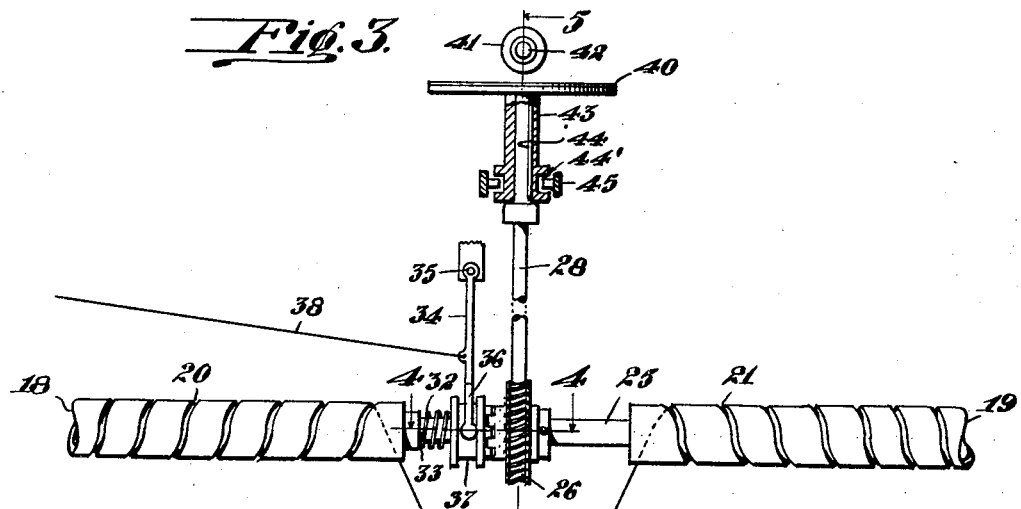
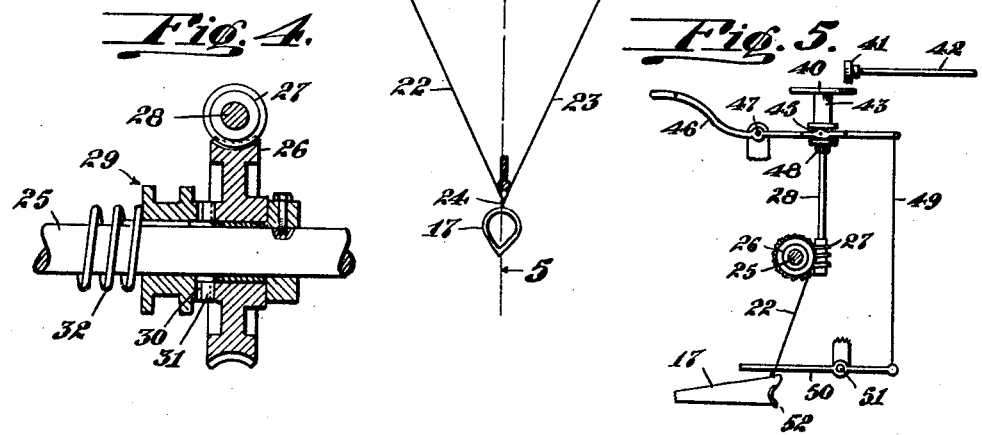
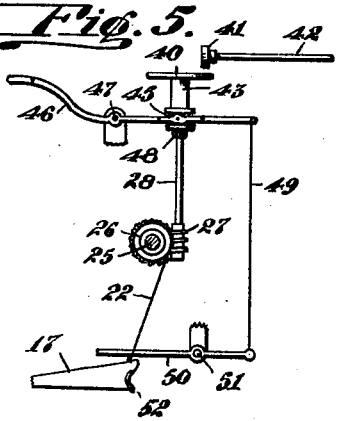
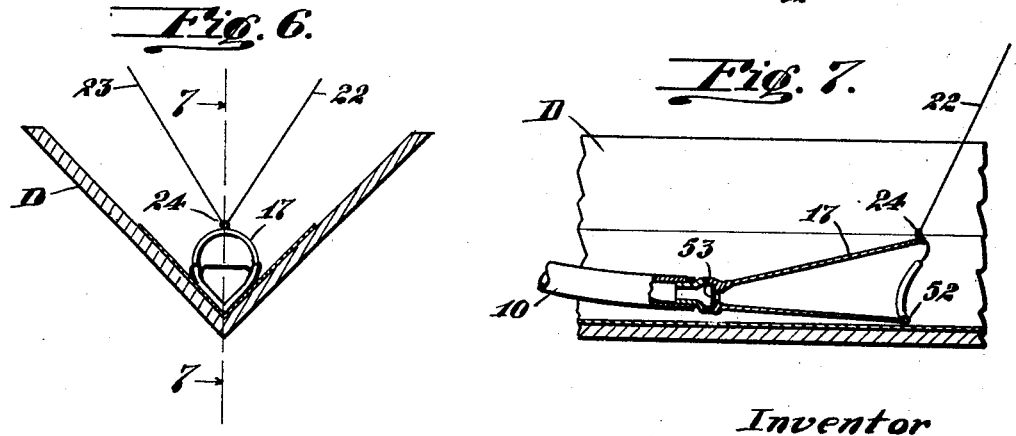
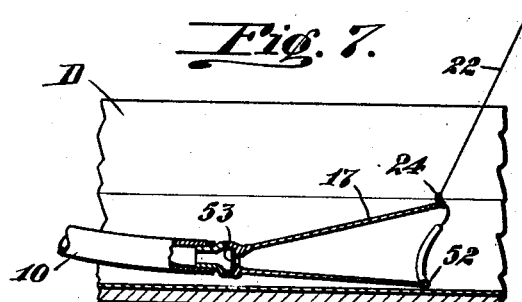
Inventor
Charlie B. Weaver;
By
R. S. Berry,
Atty.

Patented July 19, 1932

1,867,902

UNITED STATES PATENT OFFICE

CHARLIE B. WEAVER, OF LOS ANGELES, CALIFORNIA

METHOD AND MEANS FOR REFUELING AEROPLANES IN FLIGHT

Application filed January 13, 1930. Serial No. 421,713.

This invention relates to a means and method for refueling aircraft while in flight and has as its primary object the provision of a means and method for enabling the automatic delivery of fuel from a station to the fuel reservoirs of aeroplanes, dirigibles and the like, while in transit and whereby such craft may be operated on long distance non-stop flights without the necessity of carrying heavy loads of fuel and without the aid of refueling aircraft.

Another object is to provide an equipment for aircraft whereby a volume of liquid may be delivered from a source of supply to receptacles on aircraft under the urge of forces created by momentum of the craft while in flight and which may be readily controlled from the craft.

Another object is to provide an aircraft refueling apparatus embodying a conduit fitted with an intake nozzle adapted to be caused to traverse a fuel-containing trough and operable to effect delivery of fuel from the trough to the fuel reservoir of the aircraft, in which means are provided for effecting raising and lowering of the conduit and which embodies a construction and arrangement whereby the nozzle on the conduit will be maintained substantially in central alignment with the aircraft while in a lowered position.

With the foregoing objects in view, together with such other objects and advantages as may subsequently appear, the invention resides in the features and in the parts, combination, construction and arrangement of parts hereinafter described and claimed and illustrated by way of example in the accompanying drawings, in which:

Fig. 3 is a view in elevation, partly in section, of the refueling conduit raising and lowering mechanism;

Fig. 4 is a detail in horizontal section as seen on the line 4—4 of Fig. 3;

Fig. 5 is a view in section and elevation as seen on the line 5—5 of Fig. 3;

Fig. 6 is a view in section and elevation as seen on the line 6—6 of Fig. 1; and Fig. 7 is a view in section and elevation taken on the line 7—7 of Fig. 6.

Figure 1:
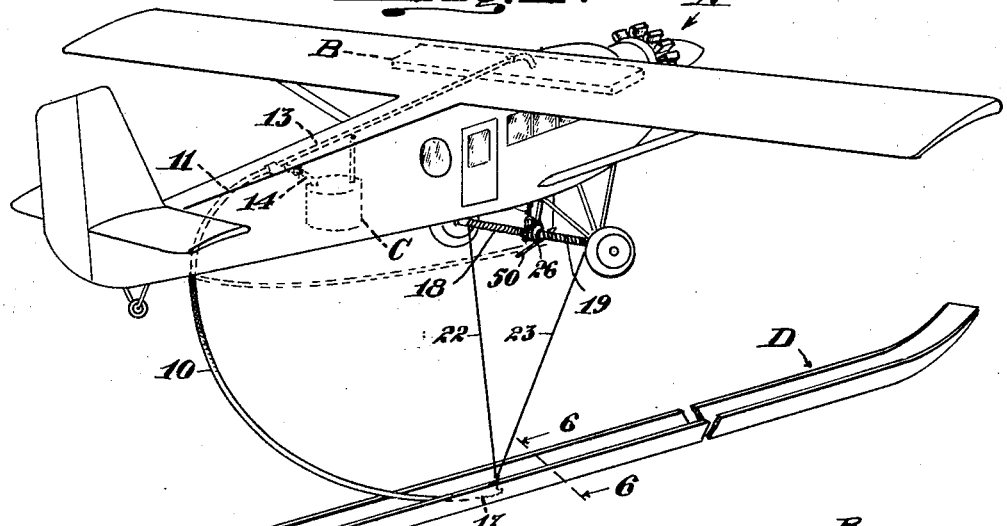
Fig. 1 is a perspective view illustrating the invention as applied to an aeroplane and showing the mode of operation thereof.
Figure 2:
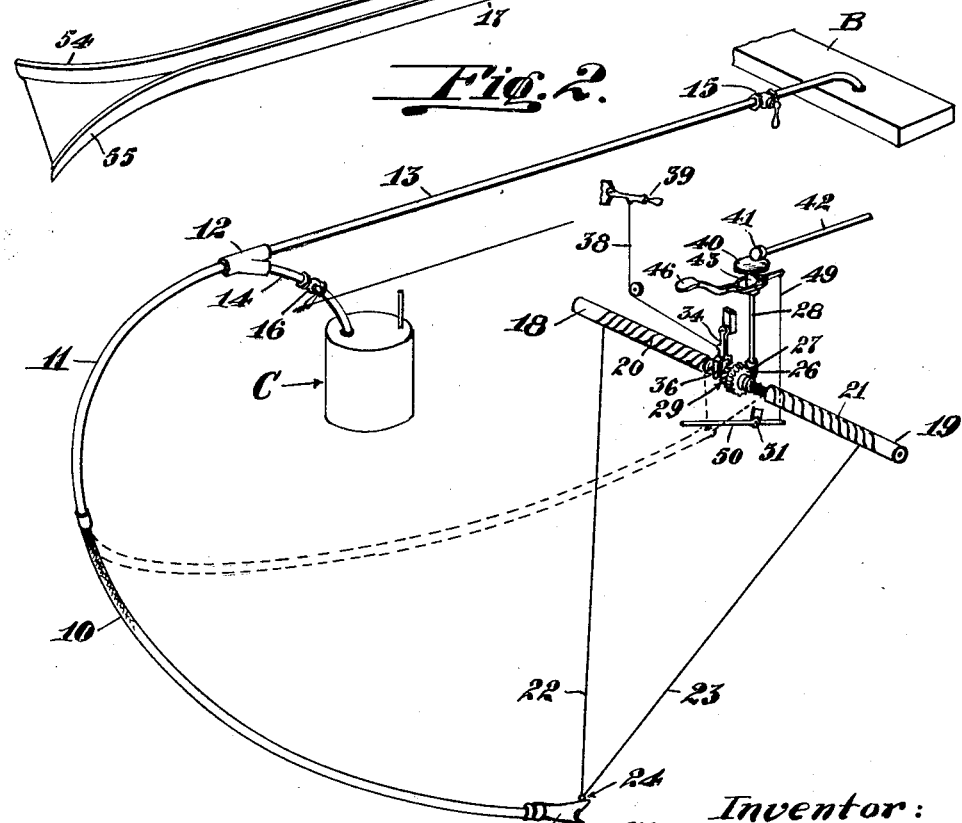
Fig. 2 is a diagram in perspective illustrating the refueling appliance.

Referring to the drawings more specifically, A indicates an aircraft which may be of any type but is here shown as comprising of an aeroplane, which craft is equipped with one or more fuel reservoirs being here shown as fitted with a main reservoir B and an auxiliary reservoir C.

In carrying out my invention, I provide a flexible conduit 10, one end of which is connected to a pipe 11 leading to the fuel reservoir or reservoirs; the pipe 11 being here illustrated as comprising a goose-neck arranged with the end portion thereof to which the conduit 10 is attached extending downwardly adjacent the rear or stern end of the aircraft and leading through the bottom thereof and as having its other end portion extending upwardly and forwardly and connecting with a Y-coupling 12 from which leads pipes 13 and 14 communicating with the reservoirs B and C respectively. The pipes 13 and 14 are equipped with cut-off valves 15 and 16 whereby the flow of liquid through the pipes 13 and 14 to the reservoirs B and C may be controlled and whereby liquid may be supplied to either one or both of the reservoirs as desired.

The flexible conduit 10 is fitted at its outer end with an intake nozzle 17 and is adapted to be raised and lowered relatively to the aircraft to which it is applied; the conduit being designed to be normally extended forwardly of the aircraft adjacent the under side thereof when not in use and being designed to be lowered into a downwardly and forwardly curved position to dispose the nozzle 17 into a trough D for containing fuel or other liquid in such manner that the nozzle in traversing the trough on forward movement of the aircraft will pick up liquid from the trough and effect its delivery to the fuel reservoirs.

The mechanism here shown as a means for raising and lowering the outer end portion of the flexible conduit embodies a pair of aligned drums or cylinders 18 and 19 formed with oppositely extending spiral grooves 20 and 21 and a pair of cables 22 and 23 leading from a common point 24 on the nozzle and connected to the cylinders 18 and 19 in such manner as to be wound in the grooves 20 and 21 on rotation of the cylinders in one direction and to be unwound therefrom on rotation of the cylinders in the opposite direction. The cylinders 18 and 19 are affixed to the outer end portions of a shaft 25 fitted with a worm wheel 26 meshing with a worm 27 on a shaft 28; the worm wheel 26 being here shown as revolubly mounted on the shaft 25 and as normally held against rotation relatively thereto by a clutch 29 splined on the shaft 25 and formed with teeth 30 on its side face which are normally engaged with teeth 31 on the worm wheel under the action of a spring 32 bearing between a shoulder 33 on the shaft 25 and the clutch 29.

The cylinders 20 and 21 are disposed at any suitable point adjacent the underside of the aircraft and forward of the connected end portion of the conduit 10, and in such position that when the cables 22 and 23 are in their wound position on the cylinders the outer end portion of the conduit will be positioned contiguous the cylinders. The clutch 29 is adapted to be operated to effect disengagement with the worm wheel and thereby permit the cylinders 20 and 21 to rotate to effect lowering of the conduit by gravity; the clutch being here shown as being operated by an arm 34 pivoted at 35 to a suitable point on the aircraft, having the usual yoke 36 engaging a peripheral channel 37 in the clutch, and which arm is here shown as adapted to be swung through the medium of a cable 38 leading to an operating lever 39.

The shaft 28 may be revolved in any suitable manner to effect winding of the cables on the cylinders but is here shown as equipped with a friction disc 40 adapted to be moved in and out of frictional engagement with a friction wheel 41 on a shaft 42 which may be rotated and driven continuously in any suitable manner as from a source of power on the aircraft. The friction disc 40 is mounted on a sleeve 43 splined for longitudinal movement on the shaft 28 by a key 44 and which sleeve 43 is provided with a peripheral channel 44' engaged by a yoke 45 on an operating lever 46 pivoted at 47. The lever 46 is here shown in the form of a foot lever. The friction disc 40 is normally disposed out of contact with the friction wheel 41, being here shown as vertically movable and as normally gravitating to a lowermost position at which it is seated on a collar 48 on the shaft 28.

As a means for preventing excess winding of the cables on the cylinders, the outer end of the lever 46 connects through a cable 49 with a trip lever 50 pivoted at 51, the outer end portion of which projects in the path of travel of the nozzle 17 on upward movement of the latter to its uppermost position in such manner that the nozzle on engaging the lever 50 will effect a downward pull on the cable 49 and thereby move the friction disc 40 out of engagement with the friction wheel 42 in opposition to manual pressure imposed on the lever 46.

The nozzle 17 has its lower portion of V-shaped cross section and is formed at its forward open end with a lip 52 whereby the forward end of the nozzle will substantially conform to the channel of the trough D as particularly shown in Fig. 6 and the inner end of the nozzle is fitted with a check valve 53 opening towards the conduit 10, which valve is adapted to close to prevent the discharge of fuel from the outer end of the feed conduit. The conduit 10 being flexible permits axial turning of the nozzle thereby permitting the nozzle to be positioned with its lower portion conforming to the V-shaped inner portion of the trough when the nozzle is seated within the trough and caused to traverse the latter.

The trough D may be of any suitable construction and may be located at any convenient point of accessibility but in order to facilitate the positioning of the nozzle 17 therein the leading end of the trough is formed with diverging side walls as indicated at 54 and 55 leading to and merging into the walls of the trough in such manner as to serve as guides in directing the nozzle into the trough.

In the operation of the invention, the aircraft equipped with the refueling appliance is piloted to pass longitudinally over the trough D at a proper altitude thereabove which is determined by the length of the conduit 10; the aircraft being flown at such height above the trough that when the outer end portion of the conduit is in its lowered position the nozzle 17 will enter the trough and will advance along the length thereof in sliding contact therewith.

At a convenient moment previous to positioning the aircraft above the trough, the conduit 10 is disposed in a lowered position which is effected by operating the clutch 29 and disengaging the worm wheel 26 whereupon the cylinders 18 and 19 are released so that the nozzled end portion of the conduit will gravitate downwardly; it being obvious that when the clutch 29 is engaged with the gear wheel the cylinders will be held against rotation under the pull of the cables 22 and 23 by reason of the worm wheel being held against rotation in one direction due to the engagement of the worm wheel with the worm 27. On then piloting the aircraft lengthwise of the trough with the nozzle 17 traversing the latter with its open intake end forwardmost, liquid fuel in the trough will be directed into the nozzle and by reason of the force created by the forward momentum of the aircraft the liquid entering the nozzle will be caused to pass upwardly through the conduit 10 and goose-neck 11 and will be directed through the pipes 13 and 14 into the reservoirs B and C on the aircraft; the liquid being delivered to either or both of the reservoirs B and C according to the opening of the valves 15 and 16. Upon a desired quantity of the liquid being delivered to the reservoirs, the valves 15 and 16 are closed thereby cutting off the supply or the nozzle 17 is withdrawn from the trough either by elevating the aircraft or by winding the cables 22 and 23 on the cylinders 18 and 19 thereby effecting discontinuation of the delivery of liquid from the trough to the reservoirs.

It will be observed that when the nozzle 17 is in a lowered position the cables 22 and 23 will lead diagonally therefrom to their connection with the outer end portions of the cylinders which is important in that the nozzle 17 will thereby be held against swaying from side to side thus stabilizing the nozzle and maintaining it in substantially longitudinal central alignment with the aircraft so as to facilitate its introduction into the trough. The conduit 10 and cables 22 and 23 being flexible permits of the nozzle being maintained in the trough in event the aircraft is flown lengthwise of the latter slightly to either side of the longitudinal center thereof; the flexibility of the hose permitting an axial turning of the nozzle necessary to cause its lower portion to conform to the trough.

When it is desired to restore the flexible conduit to its normal elevated position the friction disc 40 is moved into contact with the revolving friction wheel 41, which latter is driven from any suitable source of power whereupon the friction disc will be rotated thereby causing rotation of the cylinders 18 and 19 through the medium of the shaft 28, worm 27, worm wheel 26 and clutch 29; the cylinders 18 and 19 being then revolved in such direction as to wind the cables 22 and 23 thereon and thereby elevate the nozzled end portion of the conduit. In this operation the friction disc 40 is held in contact with the friction wheel 41 by manual pressure imposed on the lever 46. As the nozzle 17 moves to its uppermost position, it is brought against the lever 50 and thereby causes retraction of the friction disc from the friction wheel as before described, thus automatically stopping rotation of the cylinders 18 and 19. On lifting the nozzle 17 clear of the trough D the check valve 53 will automatically close thereby preventing escape of such liquid as may be confined within the conduit 10 and pipes 11, 13 and 14.

The raising and lowering mechanism while here shown as located in part beneath the aircraft may obviously be disposed at any suitable point thereon.

While I have shown and described a specific embodiment of my invention, I do not limit myself to the details of construction and arrangements set forth but may employ such modifications of the parts and equivalents thereof as occasion may require to meet varying conditions, within the meaning and scope of the appended claims.

I claim:

1. A means for refueling aircraft comprising a trough for containing liquid fuel and means controlled from the aircraft operable by forward motion of the latter to effect delivery of fuel from said trough to the aircraft, said means including a conduit, and means for confining flow of liquid through said conduit to one direction.

2. In a means for effecting refueling of aircraft while in motion, a trough of V-shaped cross section adapted to contain a liquid fuel, a conduit carried on the aircraft arranged to depend forwardly from the tail portion thereof, an intake nozzle on said conduit, said nozzle having a forward lower end portion of V-shaped section conforming to the lower inner portion of said trough, and means on the aircraft for positioning said nozzle to traverse said trough as the aircraft advances longitudinally thereof.

3. In an appliance for effecting refueling of aircraft while in motion, the combination with a fuel reservoir on the aircraft, of a conduit communicating with said reservoir, an intake nozzle on the outer end of said conduit, an inwardly opening check valve and means for raising and lowering the nozzled end portion of said conduit relatively to the aircraft.

4. In an appliance for effecting refueling of aircraft while in motion, a flexible conduit carried by the aircraft, a reservoir on the aircraft, a communication between said conduit and reservoir, an intake nozzle on the outer end of said conduit, an inwardly opening check valve in said nozzle, said conduit being arranged to swing toward and away from the under side of the aircraft, and means controllable from the aircraft for effecting raising and lowering of the nozzled end portion of said conduit.

5. In an appliance for effecting refueling of aircraft while in motion, a flexible conduit carried by the aircraft, a reservoir on the aircraft, a communication between said conduit and reservoir, an intake nozzle on the outer end of said conduit, an inwardly opening check valve in said nozzle, said conduit being arranged to swing toward and away from the under side of the aircraft, means controllable from the aircraft for effecting raising and lowering of the nozzled end portion of said conduit, and means embodied in said last-named means for holding said nozzle against sideways swinging movement relatively to the aircraft.

6. In an appliance for effecting refueling of aircraft, a reservoir carried by the aircraft, a flexible conduit, a communication between said conduit and said reservoir, an intake nozzle on the outer end of said conduit, a pair of revoluble cylinders, a pair of cables connected to said cylinders connecting with said nozzle, said cables diverging from said nozzle to said cylinders, and means for effecting rotation of said cylinders to wind said cables thereon.

7. In an appliance for effecting refueling of aircraft, a reservoir carried by the aircraft, a flexible conduit, a communication between said conduit and said reservoir, an intake nozzle on the outer end of said conduit, a pair of revoluble cylinders, a pair of cables connected to said cylinders connecting with said nozzle, said cables diverging from said nozzle to said cylinders, means for effecting rotation of said cylinders to wind said cables thereon to effect raising of said nozzle, and means controlled by upward movement of the nozzle for limiting the extent of winding of said cables on said cylinders.

8. In an appliance for effecting refueling of aircraft, a pair of aligned revoluble cylinders, a cable attached to each of said cylinders and leading therefrom, a flexible conduit having its outer end portion carried by said cables, a reservoir, a communication between said reservoir and said conduit, means for normally holding said cylinders against rotation, means for releasing said cylinders from said holding means to permit free rotation of the latter to effect unwinding of the cables therefrom, and means for rotating said cylinders to effect winding of the cables thereon.

9. In an appliance for effecting refueling of aircraft, a pair of aligned revoluble cylinders, a cable attached to each of said cylinders and leading therefrom, a flexible conduit having its outer end portions carried by said cables, a reservoir, a communication between said reservoir and said conduit, means for normally holding said cylinders against rotation, means for releasing said cylinders from said holding means to permit free rotation of the latter to effect unwinding of the cables therefrom, means for rotating said cylinders to effect winding of the cables thereon, and means for automatically limiting winding movement of said cylinders.

10. In a refueling appliance for aircraft, a flexible conduit, a fuel reservoir, a communication between said reservoir and conduit, an intake nozzle on the outer end of said conduit, means whereby the nozzled end portion of said conduit may be permitted to swing downwardly by gravity to a dependent position beneath the aircraft, means for advancing the nozzled end portion of said conduit toward the under side of the aircraft, and an inwardly opening check valve in said nozzle adapted to open under the urge of liquid entering said nozzle for preventing discharge of the liquid from said conduit.

11. Means for refueling an aircraft while in flight comprising a trough of V-shaped cross section containing a supply of liquid fuel and relatively to which the aircraft is movable vertically, longitudinally, and laterally on a plane thereabove, a flexible hose carried by an aircraft and depending therefrom, a reservoir on the aircraft with which the upper end of said hose connects, an intake nozzle on the lower end of said hose, said nozzle having a V-shaped lower portion conforming to the inner lower portion of said trough, said nozzle being turnable axially to permit its V-shaped lower portion being positioned in conformity with said trough, and flexible means on the aircraft for positioning said hose and nozzle to cause said nozzle to traverse said trough as the aircraft advances longitudinally thereof adapted to hold the nozzle centered relatively to the aircraft and being capable of flexing to permit said hose to swing vertically independent of said means.

CHARLIE B. WEAVER.